(12) United States Patent
Lee (10) Patent No.: US 12,475,962 B2
(45) Date of Patent: Nov. 18, 2025

(54) SEMICONDUCTOR DEVICE PROVIDING A TEST MODE RELATED TO DETECTING A DEFECT IN A METAL LINE

(71) Applicant: SK hynix Inc., Icheon-si (KR)

(72) Inventor: Byeong Cheol Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 164 days.

(21) Appl. No.: 18/480,027

(22) Filed: Oct. 3, 2023

(65) Prior Publication Data

US 2024/0404614 A1    Dec. 5, 2024

(30) Foreign Application Priority Data

Jun. 5, 2023 (KR) .......... 10-2023-0072364

(51) Int. Cl.
*G11C 29/00* (2006.01)
*G11C 8/08* (2006.01)
*G11C 29/02* (2006.01)

(52) U.S. Cl.
CPC .............. *G11C 29/025* (2013.01); *G11C 8/08* (2013.01)

(58) Field of Classification Search
CPC ......... G11C 8/08; G11C 8/18; G11C 11/4085; G11C 8/12; G11C 8/14; G11C 2029/2602; G11C 11/401; G11C 11/4087; G11C 11/406; G11C 8/10; G11C 11/4063; G11C 11/407; G11C 11/4097; G11C 2029/1202; G11C 2029/1802; G11C 29/18; G11C 8/20; G11C 11/22; G11C 11/2257; G11C 11/4074; G11C 2207/2227; G11C 29/70; G11C 5/025; G11C 5/147; G11C 7/06; H10B 12/315; H01L 22/34; H01L 2924/0002; H01L 2924/3011

See application file for complete search history.

(56) References Cited

U.S. PATENT DOCUMENTS 5,742,557 A    4/1998    Gibbins et al.
8,588,011 B2 *   11/2013    Sato .................. G11C 8/08
                                                365/189.16

FOREIGN PATENT DOCUMENTS

KR          0185789 B1     4/1999

* cited by examiner

*Primary Examiner* — Thong Q Le
(74) *Attorney, Agent, or Firm* — WILLIAM PARK AND ASSOCIATES LTD.

(57) ABSTRACT

A semiconductor device including a main word line driver connected to a metal line and configured to transmit a main word line signal to the metal line in order to access at least one of memory cells that are included in a core circuit, the core circuit connected to the metal line and configured to transmit, as a delay main word line signal, the main word line signal that is received through the metal line. The semiconductor device including a test mode control circuit connected to the metal line. The test mode control circuit configured to receive the delay main word line signal through the metal line. The test mode control circuit configured to perform a test mode in which the test mode control circuit drives the metal line in response to the delay main word line signal.

20 Claims, 9 Drawing Sheets

| R [KΩ] | DELAY INTERVAL [ps] | | PASS/FAIL |
|---|---|---|---|
| | ACT | PCG | |
| 0.1~1 | 35.4 | 41.3 | PASS |
| 1~2 | 104 | 98.2 | |
| 2~3 | 184 | 167 | |
| 3~4 | 267 | 241 | |
| 4~5 | 352 | 320 | FAIL POSSIBILITY |
| 5~ | – | – | |

SEMICONDUCTOR DEVICE PROVIDING A TEST MODE RELATED TO DETECTING A DEFECT IN A METAL LINE

CROSS-REFERENCE TO RELATED APPLICATION

The present application claims priority under 35 U.S.C. § 119(a) to Korean Patent Application No. 10-2023-0072364, filed in the Korean Intellectual Property Office on Jun. 5, 2023, the entire disclosure of which is incorporated herein by reference.

BACKGROUND

1. Technical Field

Embodiments of the present disclosure generally relates to a semiconductor device, and more particularly, to a semiconductor device that provides a test mode related to detecting a defect in a metal line.

2. Related Art

In general, a semiconductor device, such as DRAM, performs an active operation of accessing a memory cell in order to perform a write operation of storing data in the memory cell and a read operation of outputting the data that has been stored in the memory cell. The active operation may be performed in a way to select and enable one of main word line signals based on a row address and to select and enable at least one of sub-word line signals that have been allocated to the selected main word line signal.

SUMMARY

In an embodiment, a semiconductor device may include a main word line driver connected to a metal line and configured to transmit a main word line signal to the metal line in order to access at least one of memory cells that are included in a core circuit, the core circuit connected to the metal line and configured to transmit, as a delay main word line signal, the main word line signal that is received through the metal line, and a test mode control circuit connected to the metal line, the test mode control circuit configured to receive the delay main word line signal through the metal line, and the test mode control circuit configured to perform a test mode in which the test mode control circuit drives the metal line in response to the delay main word line signal.

In an embodiment, a semiconductor device may include a metal line configured to transmit a main word line signal as a delay main word line signal, and a test mode control circuit connected to the metal line, the test mode control circuit configured to receive the delay main word line signal through the metal line, and the test mode control circuit configured to perform a test mode in which the test mode control circuit drives the metal line in response to the delay main word line signal.

In an embodiment, a semiconductor device may include a main word line driver connected to a metal line and configured to transmit a main word line signal to the metal line in order to access at least one of memory cells that are included in a core circuit, the core circuit connected to the metal line and configured to transmit, as a delay main word line signal, the main word line signal that is received through the metal line, and a test mode control circuit connected to the metal line, the test mode control circuit configured to receive the delay main word line signal through the metal line, and the test mode control circuit configured to perform a test mode in which the test mode control circuit drives the delay main word line signal, of the metal line, in response to the delay main word line signal, to maintain a state of the delay main word line signal when the delay main word line signal was received by the test mode control circuit.

DETAILED DESCRIPTION

In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa.

When one component is referred to as being "coupled" or "connected" to another component, it should be understood that the components may be directly coupled or connected to each other or coupled or connected to each other through another component interposed therebetween. In contrast, when one component is referred to as being "directly coupled" or "directly connected" to another component, it should be understood that the components are directly coupled or connected to each other without another component interposed therebetween.

A "logic high level" and a "logic low level" are used to describe the logic levels of signals. A signal having a "logic high level" is distinguished from a signal having a "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level in some embodiments, and a signal having a logic low level may be set to have a logic high level in some embodiments.

A "logic bit set" may mean a combination of logic levels of bits included in a signal. When a logic level of each of the bits included in the signal is changed, a logic bit set of the signal may be differently set. For example, if two bits are included in a signal, a logic bit set of the signal may be set as a first logic bit set when logic levels of the two bits included in the signal are a "logic low level" and a "logic low level", and may be set as a second logic bit set when logic levels of the two bits included in the signal are a "logic low level", and a "logic high level."

Hereafter, the present disclosure will be described in more detail through embodiments. The embodiments are only used to exemplify the present disclosure, and the scope of the present disclosure is not limited by the embodiments.

Figure 1:
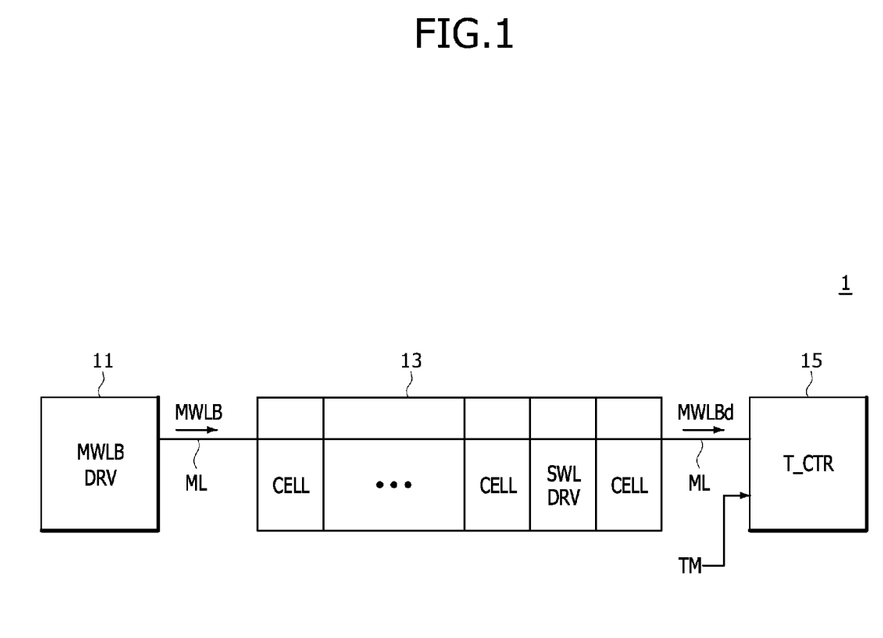
FIG. 1 is a block diagram illustrating a construction of a semiconductor device according to an example of the present disclosure.

FIG. 1 is a block diagram illustrating a construction of a semiconductor device 1 according to an example of the present disclosure. As illustrated in FIG. 1, the semiconductor device 1 may include a main word line driver (MWLB DRV) 11, a core circuit 13, and a test mode control circuit (T_CTR) 15.

The main word line driver 11 may be connected to a metal line ML. The main word line driver 11 may transmit, through the metal line ML, a main word line signal MWLB that has been enabled in order to access at least one of memory cells (not illustrated) in an active operation. The main word line driver 11 may transmit, through the metal line ML, the main word line signal MWLB that has been disabled in a precharge operation. The main word line driver 11 has been illustrated as being connected to one metal line ML, but the main word line driver 11 may be implemented to be connected to multiple metal lines depending on the number of main word line signals MWLB according to an embodiment.

The core circuit 13 may be connected to the metal line ML, and may receive the main word line signal MWLB. The core circuit 13 may include multiple cell areas (CELL) and multiple sub-word line drivers (SWL DRV). Memory cells are formed in the multiple cell areas. Each of the sub-word line drivers SWL DRV may be disposed between the multiple cell areas. The word line signal MWLB may be transmitted as a delay main word line signal MWLBd through the metal line ML of the core circuit 13. The word line signal MWLB may be delayed by a delay interval that is determined based on a resistance value of the metal line ML of the core circuit 13, and may be transmitted as the delay main word line signal MWLBd through the metal line ML. When a short circuit or a high resistance component occurs in the metal line ML, the metal line ML may have a high resistance value. As the resistance value of the metal line ML that passes through the core circuit 13 is increased, the speed at which the main word line signal MWLB is transmitted as the delay main word line signal MWLBd may be delayed. The core circuit 13 has been illustrated as being connected to one metal line ML, but the core circuit 13 may be implemented to be connected to multiple metal lines depending on the number of main word line signals MWLB according to an embodiment.

The test mode control circuit 15 may be connected to the metal line ML, and may receive the delay main word line signal MWLBd. The test mode control circuit 15 may enter a test mode in which the test mode control circuit 15 controls the driving of the metal line ML in response to the delay main word line signal MWLBd and a test mode signal TM. When entering the test mode in an active operation in response to the test mode signal TM, the test mode control circuit 15 may drive the metal line ML in response to the delay main word line signal MWLBd. More specifically, when entering the test mode in the active operation, the test mode control circuit 15 may drive the metal line ML so that the delay main word line signal MWLBd maintains an enabled state. When a precharge operation is performed after the test mode control circuit 15 enters the test mode in response to the test mode signal TM, the test mode control circuit 15 may control the driving of the metal line ML based on a resistance value of the metal line ML. For example, when the precharge operation is performed after the test mode control circuit 15 enters the test mode and the resistance value of the metal line ML is less than a target resistance value, the test mode control circuit 15 may stop the driving of the metal line ML because the main word line signal MWLB that has been disabled is transmitted as the delay main word line signal MWLBd through the metal line ML. As another example, when the precharge operation is performed after the test mode control circuit 15 enters the test mode and the resistance value of the metal line ML is the target resistance value or higher, the test mode control circuit 15 may maintain the driving of the metal line ML so that the delay main word line signal MWLBd maintains an enabled state because the main word line signal MWLB that has been disabled is not properly transmitted as the delay main word line signal MWLBd through the metal line ML. Accordingly, it may be seen that when the precharge operation is performed after the test mode control circuit 15 enters the test mode, if the delay main word line signal MWLBd is not properly disabled, the metal line ML is in the state in which a defect may occur in the metal line ML because the resistance value of the metal line ML is set as the target resistance value or higher. In the case of an embodiment in which multiple metal lines ML are provided, the test mode control circuit 15 may be implemented to be included in each of the metal lines ML. In an embodiment, a metal line ML may have a large resistance value when a resistance value of the metal line ML is equal to or greater than a target resistance value.

Figure 2:
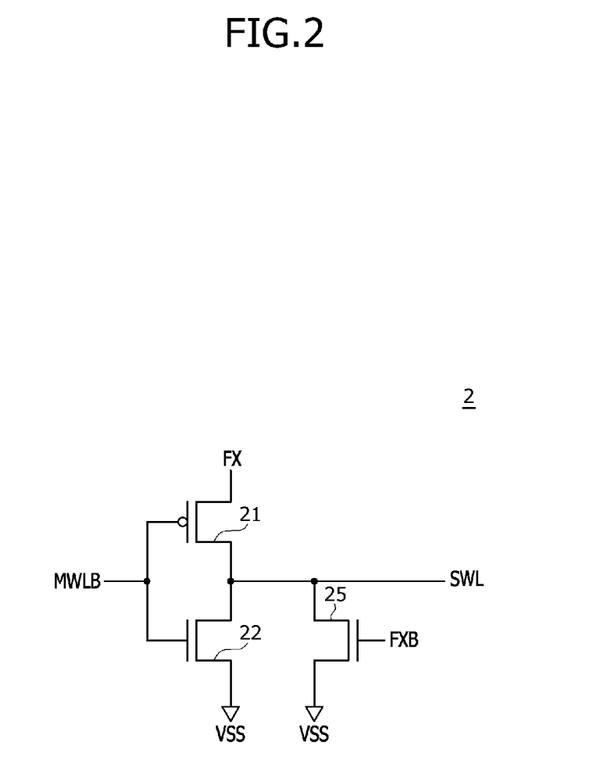
FIG. 2 is a circuit diagram according to an example of a sub-word line driver that is included in the semiconductor device illustrated in FIG. 1.

FIG. 2 is a circuit diagram according to an example of a sub-word line driver 2.

As illustrated in FIG. 2, the sub-word line driver 2 may include a PMOS transistor 21 and NMOS transistors 22 and 25. The PMOS transistor 21 may be turned on in response to the main word line signal MWLB, and may drive a sub-word line signal SWL as a selection signal FX. The selection signal FX and an inversion selection signal FXB may correspond to the sub-word line signal SWL. In order to select and enable the sub-word line signal SWL, the level of the selection signal FX may be set as a logic high level, and the level of the inversion selection signal FXB may be set as a logic low level. The NMOS transistor 22 may be turned on in response to the main word line signal MWLB, and may drive the sub-word line signal SWL with a ground voltage VSS. The NMOS transistor 25 may be turned on in response to the inversion selection signal FXB, and may drive the sub-word line signal SWL with the ground voltage VSS. The sub-word line driver 2 may generate the sub-word line signal SWL that is enabled to a logic high level when the level of the selection signal FX is set as a logic high level and the level of the inversion selection signal FXB is set as a logic low level in the state in which the main word line signal MWLB has been enabled to a logic low level. The sub-word line driver 2 may generate the sub-word line signal SWL that is disabled to a logic low level when the level of the selection signal FX is set as a logic low level and the level of the inversion selection signal FXB is set as a logic high level in the state in which the main word line signal MWLB has been enabled to a logic low level. The sub-word line driver 2 may generate the sub-word line signal SWL that is disabled to a logic low level when the main word line signal MWLB is disabled to a logic high level. The sub-word line driver 2 has been indicated as one circuit, but may be provided for each sub-word line signal and selection signal in an embodiment including multiple sub-word line signals and multiple selection signals.

Figure 3:
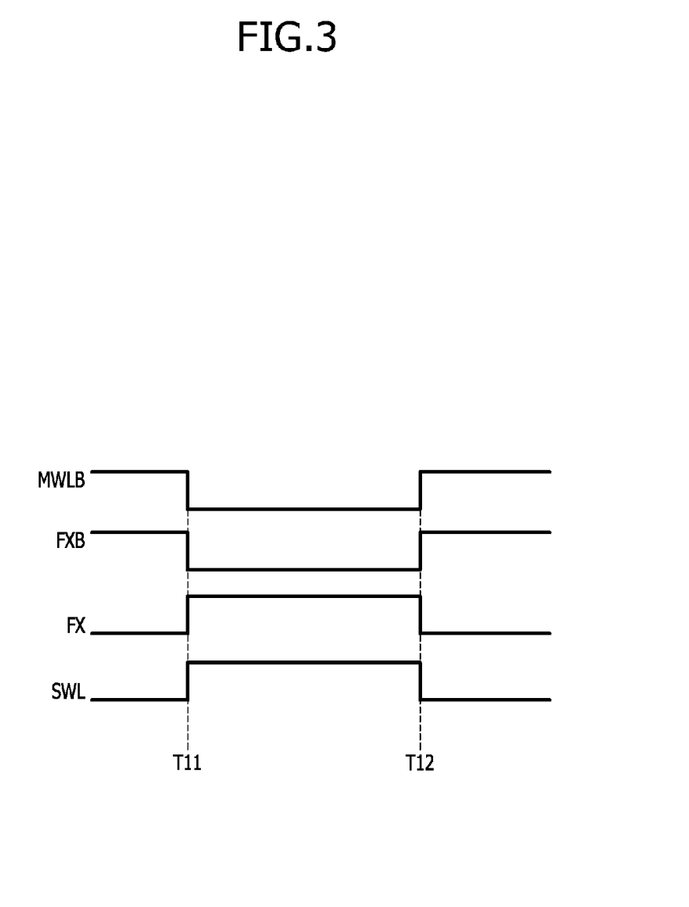
FIG. 3 is a timing diagram for describing an operation of the sub-word line driver illustrated in FIG. 2 according to an example of the present disclosure.

FIG. 3 is a timing diagram for describing an operation of the sub-word line driver 2.

As illustrated in FIGS. 2 and 3, at timing T11, when the main word line signal MWLB is enabled to a logic low level and the level of the selection signal FX is set as a logic high level for an active operation, the sub-word line signal SWL may be driven as the selection signal FX by the PMOS transistor 21 that has been turned on, and thus may be enabled to a logic high level. At timing T12, when the main word line signal MWLB is disabled to a logic high level and the level of the inversion selection signal FXB is set as a logic high level for a precharge operation, both the NMOS transistors 22 and 25 may be turned on, and the sub-word line signal SWL may be disabled to a logic low level.

Figure 4:
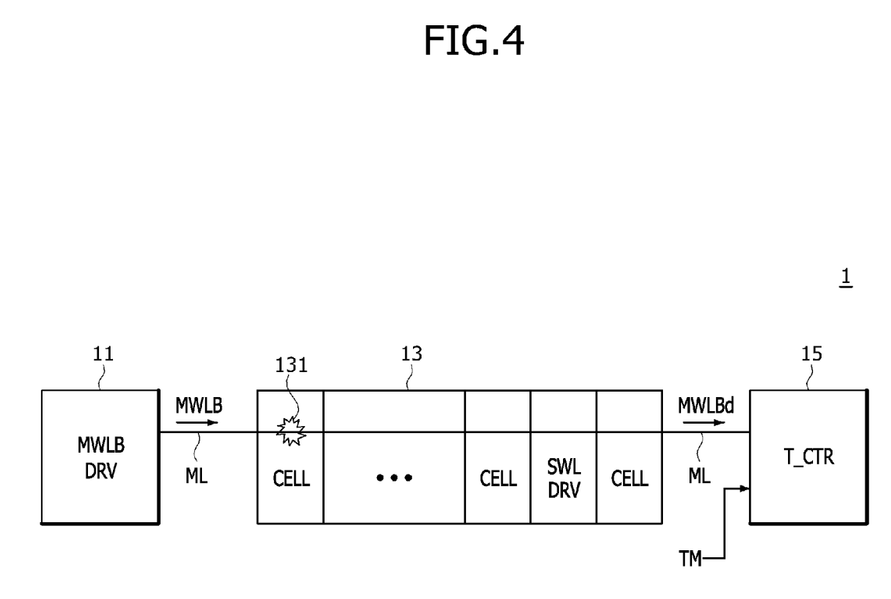
FIG. 4 is a block diagram illustrating a case in which a resistance value of a metal line is set to be high in the semiconductor device illustrated in FIG. 1.

FIG. 4 is a block diagram illustrating a case in which a resistance value of the metal line ML is set to be high in the semiconductor device 1. As illustrated in FIG. 4, when a short circuit 131 occurs in the metal line ML that has been formed in a cell area of the core circuit 13, a resistance value of the metal line ML may be set to be high. As the resistance value of the metal line ML is increased, the main word line signal MWLB might not be properly transmitted because the speed at which the main word line signal MWLB is transmitted as the delay main word line signal MWLBd is delayed.

Figure 5:
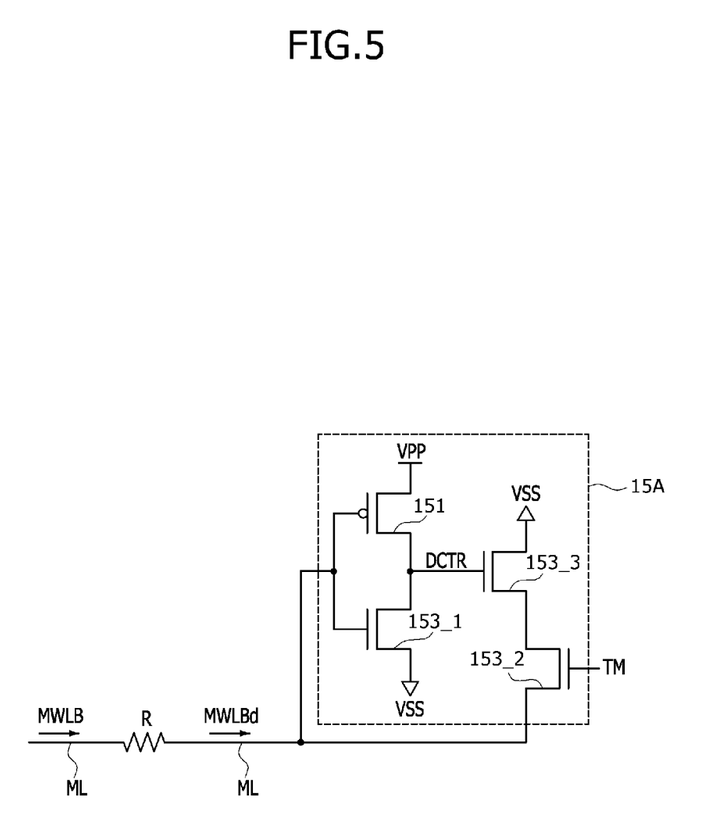
FIG. 5 is a circuit diagram according to an example of a test mode control circuit that is included in the semiconductor device illustrated in FIG. 1.

FIG. 5 is a circuit diagram of a test mode control circuit 15A according to an example of the test mode control circuit 15. As illustrated in FIG. 5, the test mode control circuit 15A may receive the delay main word line signal MWLBd that is transmitted through the metal line ML. The delay main word line signal MWLBd may be a signal of the main word line signal MWLB that is transmitted through the metal line ML. As a resistance value R of the metal line ML is set to be high depending on a short circuit and a high resistance component, the speed at which the main word line signal MWLB is transmitted as the delay main word line signal MWLBd may be delayed. The test mode control circuit 15A may include a PMOS transistor 151 and NMOS transistors 153_1, 153_2, and 153_3. The PMOS transistor 151 may be turned on when the delay main word line signal MWLBd is enabled to a logic low level, and may drive a driving control signal DCTR with a high voltage VPP. The NMOS transistor 153_1 may be turned on when the delay main word line signal MWLBd is disabled to a logic high level, and may drive the driving control signal DCTR with a ground voltage VSS. The NMOS transistor 153_2 may be turned on when receiving the test mode signal TM having a logic high level in a test mode. When the driving control signal DCTR is driven with the high voltage VPP in the state in which the NMOS transistor 153_2 has been turned on in the test mode, the NMOS transistor 153_3 may be turned on, and may drive the metal line ML (i.e., drive a signal on the metal line ML) with the ground voltage VSS so that the delay main word line signal MWLBd maintains an enabled state.

Figure 6:
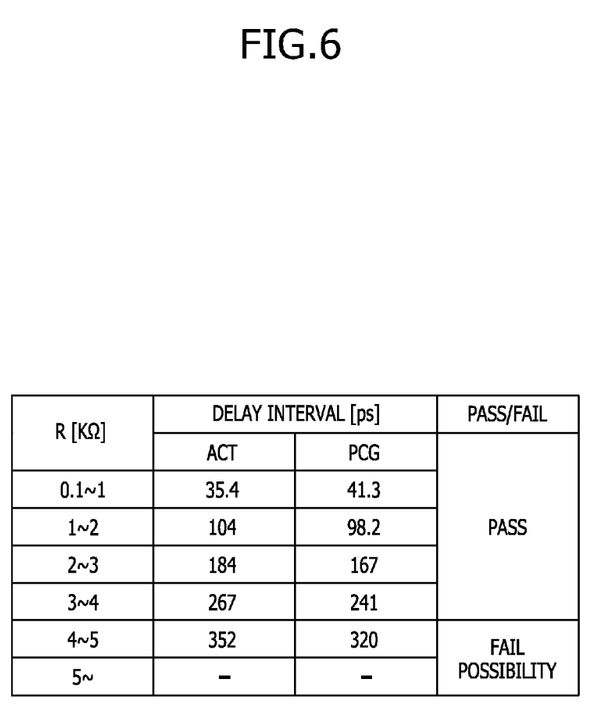
FIG. 6 is a table illustrating whether there is a possibility of a defect in the metal line depending on a resistance value of the metal line.

FIG. 6 is a table illustrating whether there is a possibility of a defect in the metal line ML depending on a resistance value of the metal line ML. As illustrated in FIG. 6, it may be seen that as the resistance value R of the metal line ML is increased, the speed at which the main word line signal MWLB is transmitted as the delay main word line signal MWLBd in an active operation ACT and a precharge operation PCG is delayed. More specifically, when an active operation (i.e., ACT) is performed in the state in which the resistance value R of the metal line ML is 0.1 to 1 KΩ, a delay interval when the main word line signal MWLB is transmitted as the delay main word line signal MWLBd may be set as 35.4 ps. When a precharge operation (i.e., PCG) is performed in the state in which the resistance value R of the metal line ML is 0.1 to 1 KΩ, a delay interval when the main word line signal MWLB is transmitted as the delay main word line signal MWLBd may be set as 41.3 ps. Furthermore, when an active operation is performed in the state in which the resistance value R of the metal line ML is 1 to 2 KΩ, a delay interval when the main word line signal MWLB is transmitted as the delay main word line signal MWLBd may be set as 104 ps. When a precharge operation is performed in the state in which the resistance value R of the metal line ML is 1 to 2 KΩ, a delay interval when the main word line signal MWLB is transmitted as the delay main word line signal MWLBd may be set as 98.2 ps. When an active operation is performed in the state in which the resistance value R of the metal line ML is 4 to 5 KΩ, a delay interval when the main word line signal MWLB is transmitted as the delay main word line signal MWLBd may be set as 352 ps. When a precharge operation is performed in the state in which the resistance value R of the metal line ML is 4 to 5 KΩ, a delay interval when the main word line signal MWLB is transmitted as the delay main word line signal MWLBd may be set as 320 ps. A case in which the resistance value R of the metal line ML is set to 4 KΩ or higher and a delay interval when the main word line signal MWLB is transmitted as the delay main word line signal MWLBd in an active operation or a precharge operation is set to 300 ps or higher may be defined as the state in which there is a possibility of a defect in the metal line ML, but this is merely an embodiment and the present disclosure is not limited thereto. As used herein, the tilde "~" indicates a range of components or numbers. For example, in FIG. 6, "4~5" indicates the numbers between 4 and 5 (i.e., 4.1, 4.2, 4.3, . . . , and 4.9).

Figure 7:
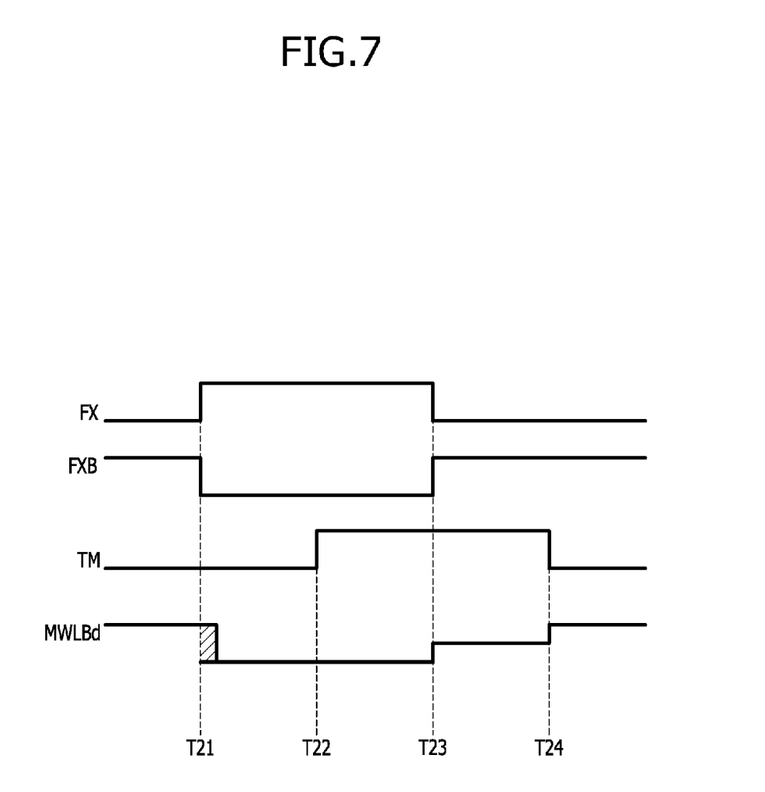
FIG. 7 illustrates timing diagrams for describing an operation of a test mode that is performed in the test mode control circuit illustrated in FIG. 5.

FIG. 7 illustrates timing diagrams for describing an operation in the test mode that is performed in the test mode control circuit 15A in the state in which the resistance value of the metal line has been set to be a target resistance value or higher.

As illustrated in FIG. 7, at timing T21, when the level of the selection signal FX is set as a logic high level and the inversion selection signal FXB is set as a logic low level for an active operation, the main word line signal MWLB that has been enabled to a logic low level may be transmitted, and thus the delay main word line signal MWLBd may be enabled to a logic low level. When the main word line signal MWLB is transmitted as the delay main word line signal MWLBd, a delay interval (i.e., a hatched interval) may be set based on a resistance value of the metal line ML. At timing T22, when the test mode signal TM is enabled to a logic high level in order to enter the test mode, the test mode control circuit 15A may drive the metal line ML with the ground voltage VSS in response to the delay main word line signal MWLBd that has been enabled to a logic low level. At timing T23, for a precharge operation, although the level of the selection signal FX is set as a logic low level, the level of the inversion selection signal FXB is set as a logic high level, and thus the main word line signal MWLB is disabled to a logic high level, the main word line signal MWLB that has been disabled to a logic high level might not be properly transmitted as the delay main word line signal MWLBd because the metal line ML is driven with the ground voltage VSS in the test mode. Accordingly, it may be seen that when the delay main word line signal MWLBd is not properly disabled to a logic high level during an interval T23 to T24 in which the precharge operation is performed in the state in which the test mode control circuit 15A has entered the test mode, the metal line ML is in the state in which there is a possibility of a defect in the metal line ML because the resistance value of the metal line ML is set as a target resistance value or higher. After timing T24, when the test mode is terminated and the test mode signal TM is disabled to a logic low level, the delay main word line signal MWLBd may be disabled as a logic high level because the driving of the metal line ML with the ground voltage VSS is stopped by the test mode control circuit 15A.

The semiconductor device 1 described above with reference to FIG. 1 may be applied to an electronic system including a memory system, a graphic system, a computing system, and a mobile system. For example, referring to FIG. 8, an electronic system 1000 according to an embodiment of the present disclosure may include a data storage unit 1001, a memory controller 1002, buffer memory 1003, and an input and output (I/O) interface 1004.

Figure 8:
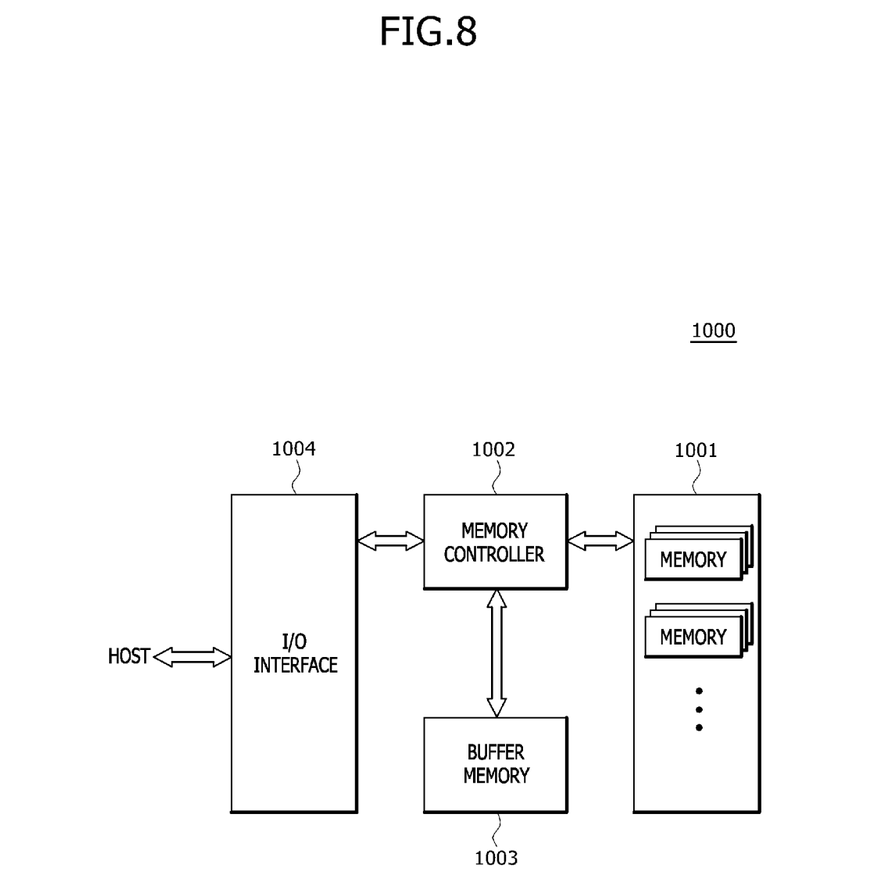
FIG. 8 is a block diagram illustrating a construction of an electronic system according to an example of the present disclosure.

The data storage unit 1001 may store data (not illustrated) that is applied by the memory controller 1002, read the stored data (not illustrated), and output the read data to the memory controller 1002, in response to a control signal from the memory controller 1002. The data storage unit 1001 may include nonvolatile memory capable of continuously storing data without losing the data although power is blocked. The nonvolatile memory may be implemented as flash memory (e.g., NOR flash memory or NAND flash memory), phase change random access memory (PRAM), resistive random access memory (RRAM), spin transfer torque random access memory (STTRAM), or magnetic random access memory (MRAM).

The memory controller 1002 may decode an instruction that is applied by an external device (or a host device) through the I/O interface 1004, and may control the input and output of data to and from the data storage unit 1001 and the buffer memory 1003 based on the results of the decoding. In FIG. 8, the memory controller 1002 has been indicated as one block, but the memory controller 1002 may include a controller for controlling the data storage unit 1001 and a controller for controlling the buffer memory 1003, that is, volatile memory, which are independently constructed.

The buffer memory 1003 may store data to be processed by the memory controller 1002, that is, data (not illustrated) that are input to and output from the data storage unit 1001. The buffer memory 1003 may store data (not illustrated) that is applied by the memory controller 1002 in response to a control signal from the memory controller 1002. The buffer memory 1003 may include the semiconductor device 1 described with reference to FIG. 1. The buffer memory 1003 may read data that has been stored in the buffer memory 1003, and may output the read data to the memory controller 1002. The buffer memory 1003 may include volatile memory, such as dynamic random access memory (DRAM), mobile DRAM, and static random access memory (SRAM).

The I/O interface 1004 may provide a physical connection between the memory controller 1002 and an external device (or a host) so that the memory controller 1002 may receive a control signal for the input and output of data to and from the external device and may exchange data with the external device. The I/O interface 1004 may include one of various interface protocols, such as a universal serial bus (USB), an multimedia card (MMC), peripheral component interconnect express (PCI-E), an serial attached SCSI (SAS), serial advanced technology attachment (SATA), parallel advanced technology attachment (PATA), an small computer system interface (SCSI), an enhanced small disk interface (ESDI), and integrated drive electronics (IDE).

The electronic system 1000 may be used as an auxiliary memory device or external storage device of a host device. The electronic system 1000 may include a solid state disk (SSD), universal serial bus (USB) memory, a secure digital (SD) card, a mini secure digital (mSD) card, a micro SD card, a secure digital high capacity (SDHC) card, a memory stick card, a smart media (SM) card, a multi-media card (MMC), an embedded MMC (eMMC), and a compact flash (CF) card.

Figure 9:
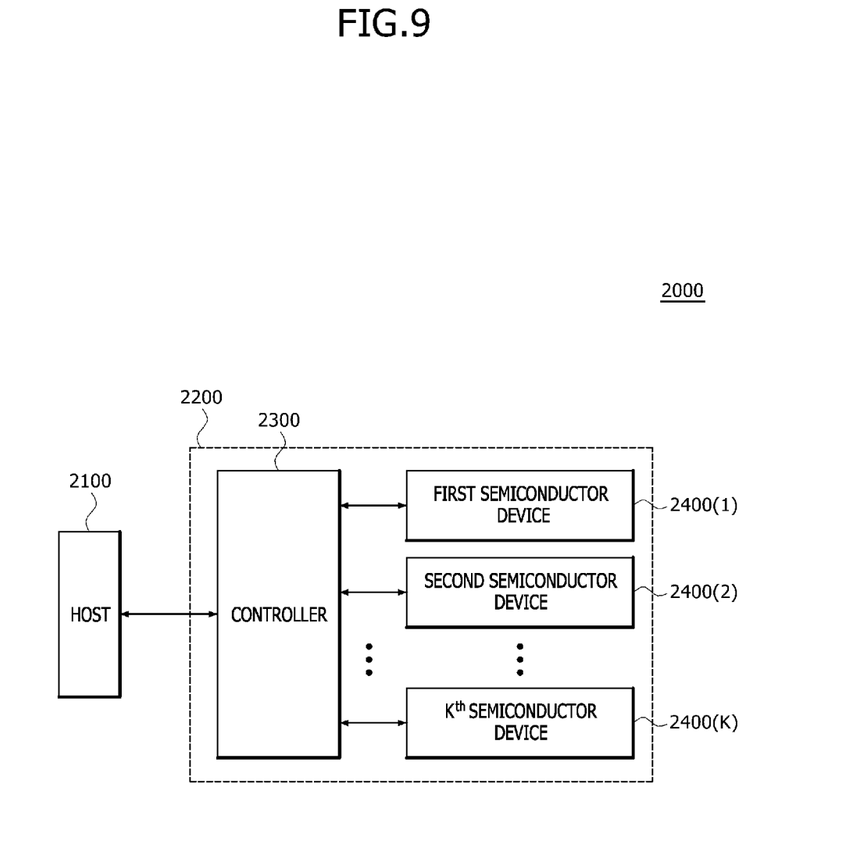
FIG. 9 is a block diagram illustrating a construction of an electronic system according to another example of the present disclosure.

FIG. 9 is a block diagram illustrating a construction of an electronic system 2000 according to another embodiment of the present disclosure. As illustrated in FIG. 9, the electronic system 2000 may include a host 2100 and a semiconductor system 2200.

The host 2100 and the semiconductor system 2200 may mutually transmit signals by using an interface protocol. The interface protocol that is used between the host 2100 and the semiconductor system 2200 may include a multi-media card (MMC), an enhanced small disk interface (ESDI), integrated drive electronics (IDE), peripheral component interconnect—express (PCI-E), advanced technology attachment (ATA), serial ATA (SATA), parallel ATA (PATA), a serial attached SCSI (SAS), and a universal serial bus (USB).

The semiconductor system 2200 may include a controller 2300 and semiconductor devices 2400(1:K). Each of the semiconductor devices 2400(1:K) may include the semiconductor device 1 described with reference to FIG. 1. Each of the semiconductor devices 2400(1:K) may be implemented as one of dynamic random access memory (DRAM), phase change random access memory (PRAM), resistive random access memory (RRAM), magnetic random access memory (MRAM), and ferroelectric random access memory (FRAM).

The embodiments of the present disclosure have been described so far. A person having ordinary knowledge in the art to which the present embodiments pertain to will understand that the present embodiments may be implemented in modified forms without departing from an intrinsic characteristic of the present disclosure. Accordingly, the disclosed embodiments should be considered from a descriptive viewpoint, not from a limitative viewpoint. The range of the present disclosure is described in the claims not the aforementioned description, and all differences within an equivalent range thereof should be construed as being included in the present disclosure.

What is claimed is:
1. A semiconductor device comprising:
a main word line driver connected to a metal line and configured to transmit a main word line signal to the metal line in order to access at least one of memory cells that are included in a core circuit;

the core circuit connected to the metal line and configured to transmit, as a delay main word line signal, the main word line signal that is received through the metal line; and a test mode control circuit connected to the metal line, the test mode control circuit configured to receive the delay main word line signal through the metal line, and the test mode control circuit configured to perform a test mode in which the test mode control circuit drives the metal line in response to the delay main word line signal, wherein the metal line has a large resistance value when a short circuit or a high resistance component occurs.

2. The semiconductor device of claim 1, wherein the main word line driver is configured to:

transmit, to the metal line, the main word line signal that has been enabled in an active operation; and transmit, to the metal line, the main word line signal that has been disabled in a precharge operation.

3. The semiconductor device of claim 1, wherein the core circuit comprises:

a cell area in which the memory cells have been formed; and a sub-word line driver configured to drive a sub-word line signal in response to the main word line signal between the cell regions.

4. The semiconductor device of claim 1, wherein the test mode control circuit is configured to enter the test mode in response to a test mode signal.

5. The semiconductor device of claim 1, wherein the test mode control circuit is configured to enter the test mode in response to a test mode signal after an active operation is performed.

6. The semiconductor device of claim 5, wherein the test mode control circuit is configured to drive the metal line by receiving the delay main word line signal that has been enabled in the active operation in a state in which the test mode control circuit has entered the test mode.

7. The semiconductor device of claim 5, wherein the test mode control circuit is configured to control whether to drive the metal line based on a resistance value of the metal line when a precharge operation is performed in a state in which the test mode control circuit has entered the test mode.

8. The semiconductor device of claim 7, wherein the test mode control circuit is configured to stop the driving of the metal line when the resistance value of the metal line is less than a target resistance value, when the precharge operation is performed in the state in which the test mode control circuit has entered the test mode.

9. The semiconductor device of claim 7, wherein the test mode control circuit is configured to drive the metal line when the resistance value of the metal line is a target resistance value or higher, when the precharge operation is performed in the state in which the test mode control circuit has entered the test mode.

10. The semiconductor device of claim 7, wherein the test mode control circuit is configured to drive the metal line with a ground voltage when the resistance value of the metal line is a target resistance value or higher, when the precharge operation is performed in the state in which the test mode control circuit has entered the test mode.

11. The semiconductor device of claim 1, wherein the test mode control circuit is configured to:

generate a driving control signal in response to the delay main word line signal; and drive the metal line in response to the driving control signal in the state in which the test mode control circuit has entered the test mode.

12. A semiconductor device comprising:

a metal line configured to transmit a main word line signal as a delay main word line signal; and a test mode control circuit connected to the metal line, the test mode control circuit configured to receive the delay main word line signal through the metal line, and the test mode control circuit configured to perform a test mode in which the test mode control circuit drives the metal line in response to the delay main word line signal, wherein the metal line has a large resistance value when a short circuit or a high resistance component occurs.

13. The semiconductor device of claim 12, wherein the test mode control circuit is configured to enter the test mode in response to a test mode signal after an active operation is performed.

14. The semiconductor device of claim 13, wherein the test mode control circuit is configured to drive the metal line by receiving the delay main word line signal that has been enabled in the active operation in a state in which the test mode control circuit has entered the test mode.

15. The semiconductor device of claim 13, wherein the test mode control circuit is configured to control whether to drive the metal line based on a resistance value of the metal line when a precharge operation is performed in a state in which the test mode control circuit has entered the test mode.

16. The semiconductor device of claim 15, wherein the test mode control circuit is configured to stop the driving of the metal line when the resistance value of the metal line is less than a target resistance value, when the precharge operation is performed in the state in which the test mode control circuit has entered the test mode.

17. The semiconductor device of claim 15, wherein the test mode control circuit is configured to drive the metal line when the resistance value of the metal line is a target resistance value or higher, when the precharge operation is performed in the state in which the test mode control circuit has entered the test mode.

18. The semiconductor device of claim 15, wherein the test mode control circuit is configured to drive the metal line with a ground voltage when the resistance value of the metal line is a target resistance value or higher, when the precharge operation is performed in the state in which the test mode control circuit has entered the test mode.

19. The semiconductor device of claim 13, wherein the test mode control circuit is configured to:

generate a driving control signal in response to the delay main word line signal; and drive the metal line in response to the driving control signal in the state in which the test mode control circuit has entered the test mode.

20. A semiconductor device comprising:

a main word line driver connected to a metal line and configured to transmit a main word line signal to the metal line in order to access at least one of memory cells that are included in a core circuit;

the core circuit connected to the metal line and configured to transmit, as a delay main word line signal, the main word line signal that is received through the metal line; and a test mode control circuit connected to the metal line, the test mode control circuit configured to receive the delay main word line signal through the metal line, and the test mode control circuit configured to perform a test mode in which the test mode control circuit drives the delay main word line signal, of the metal line, in response to the delay main word line signal, to maintain a state of the delay main word line signal when the delay main word line signal was received by the test mode control circuit, wherein the metal line has a large resistance value when a short circuit or a high resistance component occurs.

* * * * *